(12) United States Patent
Huizer

(10) Patent No.: US 9,435,195 B2
(45) Date of Patent: Sep. 6, 2016

(54) WIRELINE APPARATUS

(75) Inventor: Jan Arie Aldo Huizer, Hardinxveld-Giessendam (NL)

(73) Assignee: Paradigm Technology Services B.V., Groot-Ammers (NL)

( * ) Notice: Subject to any disclaimer, the term of this patent is extended or adjusted under 35 U.S.C. 154(b) by 368 days.

(21) Appl. No.: 14/119,983

(22) PCT Filed: May 24, 2012

(86) PCT No.: PCT/EP2012/059765
§ 371 (c)(1),
(2), (4) Date: Feb. 4, 2014

(87) PCT Pub. No.: WO2012/160170
PCT Pub. Date: Nov. 29, 2012

(65) Prior Publication Data
US 2014/0174727 A1    Jun. 26, 2014

(30) Foreign Application Priority Data

May 24, 2011    (GB) .................................. 1108693.1

(51) Int. Cl.
| | | |
|---|---|---|
| *E21B 47/12* | (2012.01) | |
| *E21B 47/04* | (2012.01) | |
| *E21B 19/22* | (2006.01) | |
| *E21B 23/14* | (2006.01) | |
| *F16H 55/52* | (2006.01) | |

(52) U.S. Cl.
CPC .............. *E21B 47/12* (2013.01); *E21B 19/22* (2013.01); *E21B 23/14* (2013.01); *E21B 47/04* (2013.01); *E21B 47/122* (2013.01); *F16H 55/52* (2013.01)

(58) Field of Classification Search
CPC ........ E21B 19/22; E21B 19/02; E21B 19/08; E21B 47/04; E21B 47/12; E21B 47/122; E21B 33/072
See application file for complete search history.

(56) References Cited

U.S. PATENT DOCUMENTS

| | | | | |
|---|---|---|---|---|
| 2,300,206 A | | 10/1942 | Clark | |
| 2,327,506 A | * | 8/1943 | Conrad ................. | E21B 47/04 33/736 |
| 2,379,106 A | | 6/1945 | Sanders | |
| 2,677,427 A | * | 5/1954 | McKinney ............ | E21B 33/072 166/77.1 |
| 3,145,995 A | * | 8/1964 | Adamson .............. | E21B 33/072 166/53 |
| 3,171,633 A | * | 3/1965 | Bus, Jr. .................... | B66D 3/04 254/415 |
| 3,532,163 A | * | 10/1970 | Ecuer .................... | E21B 33/076 166/53 |
| 3,762,725 A | * | 10/1973 | Taylor ................... | F16J 15/185 166/84.4 |

(Continued)

FOREIGN PATENT DOCUMENTS

| | | |
|---|---|---|
| WO | 0120129 A2 | 3/2001 |
| WO | 2011019714 A2 | 2/2011 |

OTHER PUBLICATIONS

Gibling, Glen R. et al., New Enhancements to Pressure Control Systems Used in Wireline Service Operations, Petroleum Society of CIM & AOSTRA, Paper No. 94-39, Conference Paper, Annual Technical Meeting, Jun. 12-15, 1994, Calgary, Alberta.

(Continued)

*Primary Examiner* — Jennifer H Gay
(74) *Attorney, Agent, or Firm* — Dickinson Wright PLLC

(57) ABSTRACT

A wireline apparatus comprises a sheave for accommodating a wireline and a sheave mounting configured for coupling to a wireline stuffing box. The apparatus includes a sensor for measuring at least one of wireline tension and deployed wireline length at the sheave.

59 Claims, 2 Drawing Sheets

(56) References Cited

U.S. PATENT DOCUMENTS

| | | | |
|---|---|---|---|
| 3,795,275 | A | 3/1974 | Bohn |
| 5,033,316 | A | 7/1991 | Van Der Ende |
| 5,062,048 | A | 10/1991 | Coulter |
| 5,305,649 | A | 4/1994 | Larimore |
| 5,351,531 | A | 10/1994 | Kerr |
| 5,390,747 | A * | 2/1995 | Gu .............. E21B 7/02 173/11 |
| 5,850,879 | A | 12/1998 | Smith |
| 6,105,939 | A * | 8/2000 | Vance ............ B66D 1/36 254/405 |
| 6,247,534 | B1 * | 6/2001 | Newman ............ E21B 19/08 166/385 |
| 6,704,655 | B2 | 3/2004 | Kelly |
| 6,745,487 | B1 | 6/2004 | Nield |
| 7,431,269 | B2 * | 10/2008 | Carlson ............ E21B 19/02 254/405 |
| 8,091,629 | B2 * | 1/2012 | Fogg ............ E21B 33/072 166/385 |
| 8,210,502 | B2 * | 7/2012 | Fogg ............ E21B 33/072 254/406 |
| 8,851,860 | B1 * | 10/2014 | Mail ............ F04B 47/02 166/105 |
| 2002/0077753 | A1 * | 6/2002 | Kelly ............ G01V 11/002 702/1 |
| 2010/0294479 | A1 * | 11/2010 | Shee ............ E21B 19/008 166/65.1 |
| 2010/0314099 | A1 * | 12/2010 | Fogg ............ E21B 33/072 166/77.2 |
| 2010/0317474 | A1 * | 12/2010 | Fogg ............ E21B 33/072 474/113 |
| 2012/0103248 | A1 * | 5/2012 | Hickman ............ E21B 19/02 116/284 |
| 2013/0199793 | A1 * | 8/2013 | Sorensen ............ E21B 19/22 166/351 |
| 2014/0174727 | A1 * | 6/2014 | Huizer ............ E21B 47/04 166/250.01 |

OTHER PUBLICATIONS

Foster, Jerry et al., Slickline-Deployed Electro-Mechanical Intervention System: A Cost-Effective Alternative to Traditional Cased-Hole Services, SPE 70031, Conference Paper, SPE Permian Basin Oil and Gas Recovery Conference, May 15-16, 2001, Midland Texas.

* cited by examiner

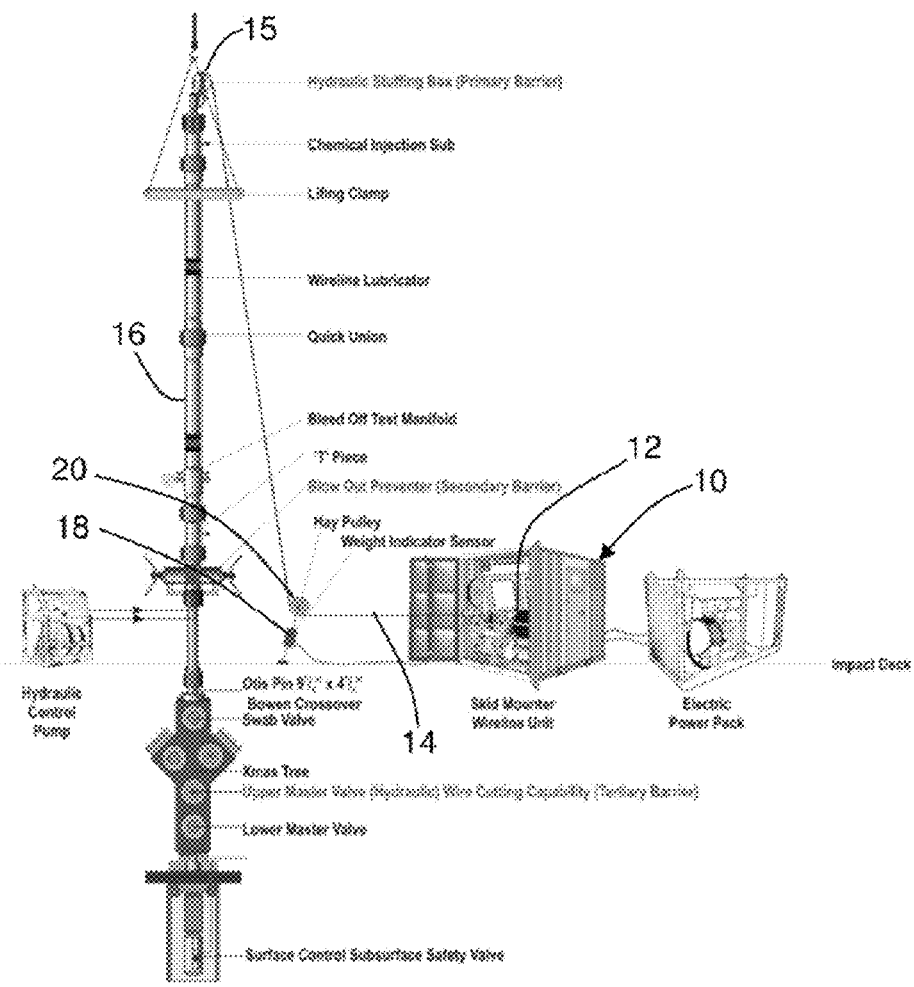
Figure 1 -- PRIOR ART --
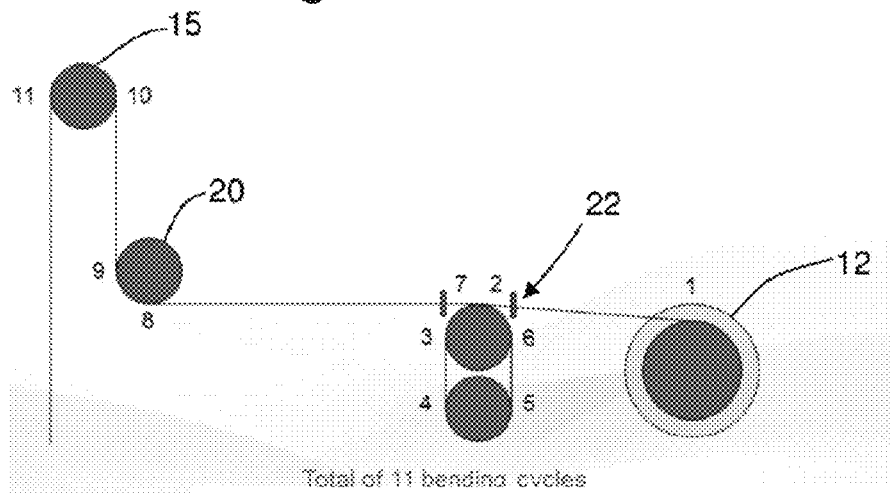
Figure 2 -- PRIOR ART --

WIRELINE APPARATUS

CROSS-REFERENCE TO RELATED APPLICATION

This U.S. National Stage Patent Application claims the benefit of International Application serial number PCT/EP2012/059765 filed May 24, 2012, which claims the benefit of GB 1108693.1 filed on May 24, 2011, the entire disclosures of the applications being considered part of the disclosure of this application, and hereby incorporated by reference.

FIELD OF THE INVENTION

This invention relates to wireline apparatus. In particular, the invention relates to an apparatus and a method for providing information on wireline parameters during well service operations.

BACKGROUND OF THE INVENTION

It is often necessary or desirable to run tools or sensors into drilled bores, such as are utilized in the oil and gas industry to access subsurface hydrocarbon-bearing formations. These operations often involve use of spoolable support members, such as wireline. In comparison to operations in which tools are mounted on jointed pipe, for example drill pipe, such operations allow an operator to lower and raise tools and sensors in the bore at a relatively rapid rate, using relatively straightforward surface apparatus.

An example of the surface equipment used in wireline operations is illustrated in FIG. 1 of the accompanying drawings. This equipment comprises three major component parts: a wireline unit, of which the principal component is a wireline winch; the wire itself, and a lubricator assembly.

The wireline unit includes a winch drum around which the wireline is reeled. The winch drum is driven by a prime mover, for example an electric motor. The winch unit incorporates a mechanical measuring device, or "Depth Counter", which measures the length of wireline that has been deployed and thus is used to indicate to the operator the distance tools have travelled up or down the hole. The device utilizes a measuring wheel around which the wire is wrapped, and the revolutions of this wheel are correlated to depth and displayed on a recorder or depth gauge. A weight/tension indicator may be connected to the hay pulley that guides the wire from the wireline unit up to the top of the lubricator assembly. In more sophisticated wireline units, a two or three wheel wraparound depth measuring device may be provided with an integral load cell for wire tension measurement.

The depth measurement and wire tension are perhaps the two key operating parameters during a well service operation. The winch operator will run a wireline-mounted tool into the well to a predetermined desired depth using the depth measuring device while changes in wire tension are monitored and may be used to determine downhole tool engagement and disengagement. The operator may also use the wire tension indicator to ensure that the wire is not subject to a tension likely to damage the wire.

The wireline form may vary widely, being selected to suit the particular nature of the wireline work. The wireline may be several kilometers long and formed of special alloy, and is thus likely to represent a significant investment on the part of the wireline provider/operator.

The lubricator assembly is a tubular pressure chamber arrangement which may be fixed to the top of the wellhead and permits tools and other equipment to be placed into the well and subsequently retrieved. In operation, the lubricator is somewhat similar to an air lock, in that it is operable to isolate the interior of the lubricator from well pressure, such that the lubricator may then be opened and tools and sensors secured to the end of the wireline. However, when tools are downhole, the lubricator is subjected to full wellhead pressure.

The lubricator is assembled in sections and connected with 'quick unions' having integral pressure seals. There must also be a seal around the wire at the top of the lubricator to prevent well pressure escaping from the entry point into the lubricator. The seal must be efficient enough to prevent pressure escape, but also allow movement of the wire. A wireline stuffing box performs this function for single strand wireline such as slick or piano wire.

The wireline stuffing box normally serves two functions. In combination with a sheave wheel mounted on the upper end of the lubricator assembly, the stuffing box guides the wire from the bottom hay pulley into the top of the lubricator assembly. The stuffing box also contains well pressure while the wireline is moving or standing still. Sealing around the wire within the stuffing box is achieved using mechanical or hydraulically energized stacks of packing elements.

Braided wire requires a more sophisticated system of pressure sealing than single strand wire. In one arrangement highly viscous oil is pumped continuously into the lubricator and into flow tubes through which the braided line passes. The oil fills the small annular space between the wire and the inside of the flow tube to prevent well pressure escaping past the wire. The oil exits at the top of the lubricator and is channeled into drums for disposal.

The lower end of the lubricator assembly includes a wireline blowout preventer (BOP) having moveable rams with shaped rubber elements which may close and seal on the wire without damaging the wire. This allows wellbore pressure to be contained below the BOP, allowing depressurization above and opening of the lubricator.

SUMMARY OF THE INVENTION

According to the present invention there is provided a wireline sheave apparatus comprising: a sheave configured for accommodating a wireline; a sheave mounting configured for coupling to a wireline stuffing box, the sheave being mounted on the sheave mounting; and a sensor for measuring at least one of wireline tension and deployed wireline length at the sheave.

The sheave mounting may include the sensor.

According to another aspect of the present invention there is provided an apparatus comprising: a sheave for accommodating a wireline; and a sheave mounting configured for coupling to a wireline stuffing box and including a sensor for measuring at least one of wireline tension and deployed wireline length.

According to a further aspect of the present invention there is provided a wireline work method comprising: mounting a sheave on a sheave mounting, coupling the sheave mounting to a wireline stuffing box, passing wireline around the sheave and measuring at least one of wireline tension and deployed wireline length at the sheave.

It should be understood that the steps of mounting a sheave on a sheave mounting, coupling the sheave mounting to a wireline stuffing box and passing wireline around the sheave may be performed in any order. The steps of mounting a sheave on a sheave mounting, coupling the sheave mounting to a wireline stuffing box and passing wireline around the sheave may be performed sequentially. The steps of mounting a sheave on a sheave mounting, coupling the sheave mounting to a wireline stuffing box and passing wireline around the sheave may at least partially overlap.

The provision of the sensor as part of the wireline sheave apparatus for measuring at least one of wireline tension and deployed wireline length at the sheave may obviate the requirement to provide a separate measuring device at a location different to or remote from that of the wireline sheave apparatus, thus simplifying the wireline set-up, and removing the requirement to feed the wire through the separate measuring device. Alternatively, or in addition, the apparatus may be used to supplement a more conventional measuring arrangement. Also, compared to a conventional two or three wheel wrap-around measuring device, the number of bending cycles the wireline experiences may be substantially reduced, reducing wireline fatigue and extending wireline life.

Wireline may comprise a solid, single strand or a multi-strand wire. Solid, single strand wires are known by various terms, including: slick line; piano wire; solid line; wireline, and measuring line. Multi-strand wire is also referred to by a range of terms, including: braided wire; multi-strand wire (or line); torpedo line, and well-shooter's line. Solid wireline is available in a range of diameters, typically 0.092, 0.108, 0.125, 0.140, 0.150 and 0.160 inches. Multi-strand wire is generally of 3/16, or 7/32 inches in diameter, but is also available in other sizes. Wireline is available in a range of materials, such as mild steel and various alloys, including stainless steels, Monel (trademark) nickel alloys and Inconel (trademark) austenitic nickel-chromium-based superalloys for corrosive environments. Wireline may also be formed of or incorporate composites and signal carrying-elements, such as electrical wiring or optical fibres.

The apparatus may include a transmitter for relaying information gathered by the sensor to an appropriate location, for example a wireline control unit, which may record or display gathered information. The transmitter may operate wirelessly, thus obviating the requirement to provide a physical link between the apparatus and the wireline control unit. An operator may therefore dispense with the conventional requirement to provide and hook up signal cables, and there is then of course no danger of damaging such cables during wireline operations. The provision of wireless transmission, for example using radio frequency transmitters and receivers, also facilitates signal transmission to a variety of different locations, for example a local wireline unit and a more remote control centre.

The apparatus may be configured for coupling to an upper end of a stuffing box or lubricator string such that the wireline extending between the sheave and the stuffing box is aligned with the wireline passing through the stuffing box.

Embodiments of the invention may incorporate a stuffing box or a lubricator string. The stuffing box may take any appropriate form, and may include sealing or packing elements to provide a sliding, sealing contact with the wireline. The packing elements may take any appropriate form and may be hydraulically actuated. The lubricator string may include integrated pressure sensors for providing well pressure and stuffing box hydraulic pressure information during operation.

The sheave may be configured to guide the wireline from a bottom hay pulley into the top of the lubricator and into a well.

The apparatus may be configured such that the sheave contact angle with the wireline is maintained substantially constant, typically at or around 180 degrees, facilitating provision of accurate wireline tension information. This may be assured by provision of guides, such as appropriately positioned rollers.

The sheave may serve as a wireline length measuring wheel and have a calibrated outer diameter. The sheave wheel may have a wear resistant rim. The sheave wheel may have a lightweight material hub to reduce weight and inertia.

The sheave may include a wire retaining arrangement, such as an arrangement of spring-mounted wire retainer rollers, or a wire wrap-around, to ensure that the wireline is maintained in contact with the sheave. This assists in minimizing or preventing wire slippage at low wire tension, thus minimizing measurement error. The retaining force provided by the arrangement may be selected to ensure that axial translation of the wire translates to corresponding rotation of the sheave wheel, even with sudden changes of direction such as experienced during jarring operations. The arrangement may also serve to retain the wire in the sheave groove, and this may be useful during set-up of a wireline-running operation. The arrangement may be configured to press the wire against the sheave regardless of wire size.

The apparatus may include provision for measuring one or more of wireline length, wireline tension and wireline speed. The apparatus may include provision for measuring stuffing box pressure or well pressure, or may be configured to communicate with appropriate pressure sensors in a lubricator assembly or other apparatus.

The sheave mounting may comprise a suitable bracket or frame. The frame may provide mounting for one or more sensors. The frame may take any appropriate form and may be in one or more parts. Sensors may be provided between elements of the frame to measure parameters indicative of forces acting on the wireline. A strain gauge may be mounted on the frame and may be utilized to measure wire tension. In one embodiment parts of the frame may be arranged to pivot relative to one another and tension on the wireline may tend to cause the parts to pivot, such that a strain gauge on a load pin preventing the parts from pivoting may be utilized to measure wireline tension. Dual independent strain gauges may be provided, such that back-up is available should one strain gauge fail. Alternatively, or in addition, a hydraulic load cell may be mounted on the frame.

The apparatus may be configured to measure the length of wire passing over the sheave, indicative of the length of wire in the well. The apparatus may include one or more sensors configured to measure one or more of sheave rotation and sheave rotation direction. Such sensors may include one or more of a mechanical counter, encoder and electromagnetic speed sensor. In one embodiment the mechanical counter and encoder provide a primary output with the electromagnetic speed sensor providing an independent back-up signal.

The apparatus may be configured to permit depth and tension to be displayed and recorded on an electronic display in an associated wireline unit, which may form an element of the invention. The wireline unit may be configured to process signals received from the sensors to provide depth figures which are accurate for the diameter of wireline being used, without requiring replacement of the sheave wheel. This correction may be achieved electronically in a display, using the depth information provided by the encoder and wireline diameter information supplied by the operator or by appropriate sensors.

One or more of depth, tension and well pressure signals may be transmitted wirelessly to a receiver connected to the electronic display or an associated processor. An electronics module for transmitting the signals may be mounted on the sheave mounting. The module may house one or more of sensor amplifiers, power supply, batteries, transmitters and antenna.

The apparatus may include an independent power source. The apparatus may include a power source which is recharged through rotation of the sheave, for example a battery may be charged by a generator in an encoder and an energy harvesting module.

It will be apparent to those of skill in the art that many of the various optional features described above have utility independently of the particular aspects of the present invention to which they refer. Accordingly, these optional features may themselves provide further individual aspects of the invention, some of which are set out below.

Another aspect of the invention relates to running wireline and measuring at least one of wireline tension and length, wherein the wireline experiences less than eleven bending cycles between the wireline winch and the stuffing box.

A further aspect of the present invention relates to a stuffing box sheave assembly including a sensor and a transmitter for transmitting signals from the sensor to a unit for storing or displaying information gained from said signals.

BRIEF DESCRIPTION OF THE DRAWINGS

These and other aspects of the present invention will now be described, by way of example, with reference to the accompanying drawings, in which:

FIG. 1 illustrates typical wireline operation surface equipment;

FIG. 2 is a schematic illustration of elements of wireline operation surface equipment and illustrating the number of bending cycles experienced by a wireline when using a two wheel wraparound measuring device;

DETAILED DESCRIPTION OF THE DRAWINGS

Figure 3:
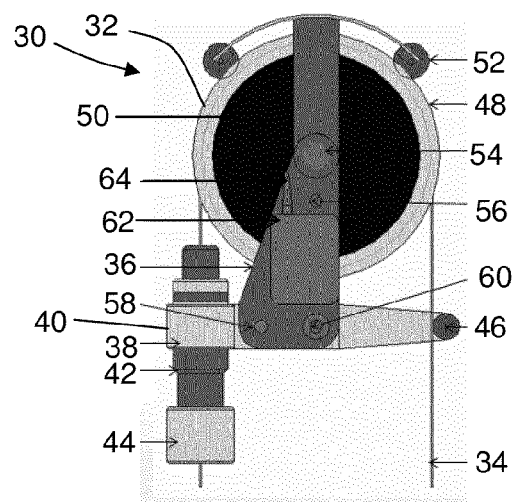
FIG. 3 illustrates wireline apparatus according to an embodiment of the invention.

Reference is first made to FIG. 1 of the drawings, which illustrates an example of the surface equipment used in wireline operations, as will be familiar to those of skill in the art. As described above, the equipment comprises a wireline unit 10 including a wireline winch 12 carrying a spool of wireline 14, and a lubricator assembly 16.

The wireline unit 10 also includes a measuring wheel, sometimes referred to as a measuring head, around which the wire is wrapped, and the revolutions of this wheel are correlated to depth and displayed on a recorder or depth gauge within the unit. A weight/tension sensor 18 may also be connected to the hay pulley 20 that guides the wire 14 from the wireline unit 10 up to the stuffing box sheave 15 on top of the lubricator assembly 16 and which prevents any lateral force being exerted on the lubricator and wellhead. More sophisticated wireline units may feature a two or three wheel wraparound depth measuring device incorporating an integral load cell for wire tension measurement.

FIG. 2 of the drawings is a schematic illustration of an arrangement incorporating a wraparound depth measuring device 22 and illustrating the number of bending cycles experienced by a wireline when using such a device. In particular, the bending cycles are numbered in sequence starting from the wireline winch 12 and then passing through the measuring device 22, the hay pulley 20, and the stuffing box sheave 15.

Reference is now made to FIG. 3 of the drawings, which illustrates wireline apparatus 30 according to an embodiment of the invention. The apparatus 30 comprises a stuffing box sheave 32 for accommodating a slickline 34, the sheave 32 being mounted on a first frame part in the form of a sheave bracket 36 which is itself mounted on a second frame part in the form of a swivel bracket 38. A collar 40 forming part of the swivel bracket 38 engages a stuffing box 42 adapted to be mounted to an upper end of a lubricator assembly (not shown in FIG. 3) via a releasable union 44.

The sheave 32 is configured to guide the slickline 34 from a bottom hay pulley into the top of the lubricator and into a well. The sheave contact angle with the wireline is maintained substantially constant at 180 degrees by tension retainer rollers 46. The sheave 32 also includes spring-mounted wire retainer rollers 52, to ensure that the slickline 34 is maintained in contact with the sheave 32.

As will be described in greater detail below, the apparatus 30 includes various sensors which gather information for transmission to a wireline control unit, which records and displays the gathered information. In particular, the apparatus 30 includes provision for measuring wireline length or depth, wireline tension and wireline speed. The apparatus 30 also links to pressure sensors in the lubricator assembly to gather and transmit well pressure and stuffing box hydraulic pressure information.

The sheave 32 serves as a wireline length measuring wheel and has a calibrated outer diameter. The sheave wheel has a wear resistant rim 48 and a lightweight material hub 50 to reduce weight and inertia.

A mechanical counter and depth encoder 54 is mounted on the sheave bracket 36 adjacent the sheave axis and by measuring the number of sheave rotations provides an indication of the length of slickline 34 that has passed over the sheave 32, indicative of the length or depth of slickline 34 in the well.

The bracket 36 also provides mounting for a dual channel Hall effect speed and direction sensor 56.

The sheave bracket 36 is mounted to the swivel bracket 38 via a pivot pin 58 which is laterally offset from the sheave axis. The orientation of the sheave bracket 36 is maintained by a load pin 60 which incorporates dual independent strain gauges, to measure slickline tension.

Figure 4:
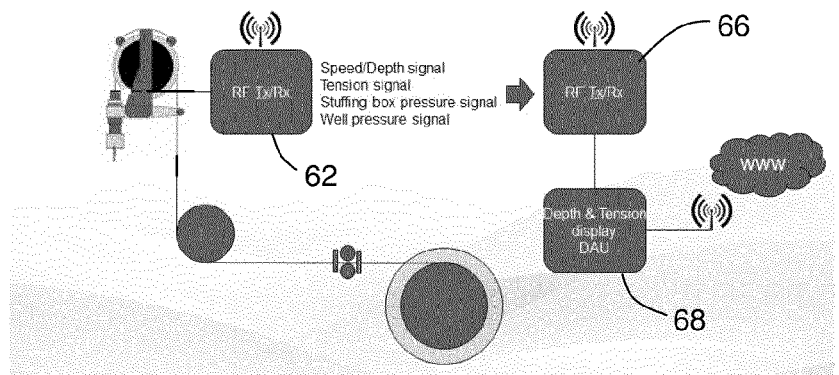
FIG. 4 is a block diagram of a wireless transmission system of the apparatus of FIG. 3.

An electronics module 62 is also mounted on the sheave bracket 36, the module 62 housing sensor amplifiers, batteries, transmitters and providing mounting for an RF antenna 64. The module 62 is also illustrated in block diagram form in FIG. 4 of the drawings, the figure also illustrating how signals representative of slickline speed, depth and tension, and of stuffing box and well pressure are transmitted from the module 62 to a receiver 66 in the wireline unit. The signals are processed for storage and display on an electronic display 68 in the wireline unit. The information obtained may also be transmitted from the wireline unit by any appropriate means, for example via the internet, to one or more other locations.

Figure 5:
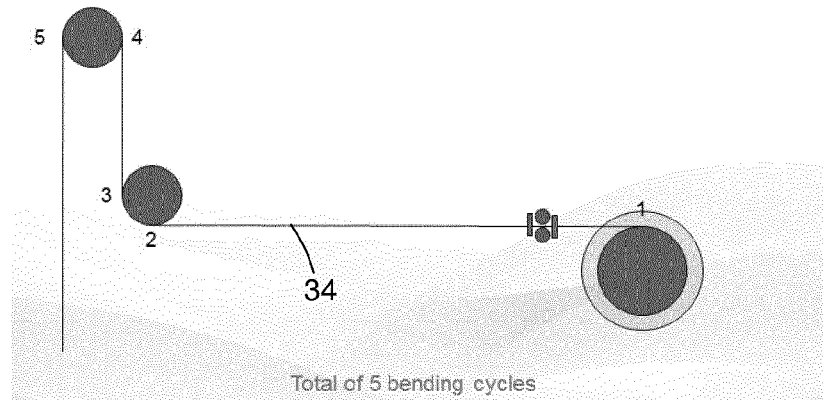
FIG. 5 is a schematic illustration of elements of the apparatus of FIG. 3 and illustrating the number of bending cycles experienced by a wireline when using the apparatus of FIG. 3.

As illustrated in FIG. 5 of the drawings, the apparatus 30 allows the number of bending cycles experienced by the slickline 34 to be reduced from eleven to five when compared to the commonly used industry standard two or three wheel wrap around measuring devices as illustrated in FIG. 2. Although not illustrated in FIG. 5, in some arrangements the action of the tension retainer rollers 46 may induce some minor bending of the slickline in bringing the slickline into the preferred alignment to engage the sheave 32, although the number of bending cycles experienced by the slickline will still be less than the conventional eleven or more. The significant decrease in bending cycles experienced by the slickline facilitates extension of slickline life.

The apparatus 30 may also be used on existing wireline units such that there is no need for any changes to existing equipment.

Use of the apparatus also facilitates safer operations, the pressure sensors minimizing the risk of inappropriate actions. For example, the wireline unit may be programmed to prevent putting well pressure on the lubricator assembly without the stuffing box packing elements being energized.

It will be apparent to those of skill in the art that the above-described embodiment is merely exemplary of the present invention and that various modifications and improvements may be made thereto without departing from the scope of the invention as set out in the appended claims.

In the interests of brevity, the dependent claims have not been repeated with reference to each and every independent claim, however those of skill in the art will recognize that the optional features set out in the claims depending from one independent claim may also be applied to the other independent claims.

The invention claimed is:

1. A wireline sheave apparatus comprising:
a sheave for accommodating a wireline;
a sheave mounting configured for coupling to a wireline stuffing box, the sheave being mounted on the sheave mounting; and
a sensor for measuring wireline tension,
wherein the sheave mounting comprises a frame which includes a first frame part and a second frame part, the first and second frame parts being arranged such that tension on the wireless tends to cause the first and second frame parts to pivot relative to one another; and
wherein the sensor is provided between the first and second frame parts so as to measure parameters indicative of forces acting on the wireline.

2. The apparatus of claim 1, including a sensor for measuring both wireline tension and wireline length.

3. The apparatus of claim 1, wherein the apparatus includes a transmitter for relaying information gathered by the sensor.

4. The apparatus of claim 3, including a wireline control unit configured to receive and process said information.

5. The apparatus of claim 4, wherein the wireline control unit is configured to record or display gathered information.

6. The apparatus of claim 3, wherein the transmitter is configured to relay information wirelessly.

7. The apparatus of claim 3, wherein the transmitter is a radio frequency transmitter.

8. The apparatus of claim 1, configured for measuring wireline speed.

9. The apparatus of claim 1, wherein the apparatus is configured for transmitting signals from pressure sensors.

10. The apparatus of claim 1, wherein the apparatus is configured to communicate with pressure sensors in a lubricator assembly.

11. The apparatus of claim 1, configured for measuring at least one of stuffing box pressure and well pressure.

12. The apparatus of claim 1, including a swivel for coupling to the stuffing box.

13. The apparatus of claim 1, including the stuffing box or a lubricator string.

14. The apparatus of claim 12, configured such that wireline extending between the sheave and the stuffing box is axially aligned with the wireline passing through the stuffing box.

15. The apparatus of claim 1, including a lubricator string including pressure sensors for providing at least one of well pressure and stuffing box hydraulic pressure information.

16. The apparatus of claim 1, including a wireline.

17. The apparatus of claim 1, wherein the apparatus is configured such that wireline used in combination with the apparatus experiences less than eleven bending cycles between a wireline reel and a lubricator.

18. The apparatus of claim 1, wherein the sheave is configured to guide wireline from a bottom hay pulley into the top of a lubricator and into a well.

19. The apparatus of claim 1, configured such that the sheave contact angle with the wireline is maintained substantially constant.

20. The apparatus of claim 1, wherein the sheave contact angle is maintained at or around 180 degrees.

21. The apparatus of claim 1, including wireline guides for maintaining a desired sheave contact angle.

22. The apparatus of claim 1, wherein the wireline guides comprise rollers.

23. The apparatus of claim 1, wherein the sheave serves as a wireline length measuring wheel and has a calibrated outer diameter.

24. The apparatus of claim 1, wherein the sheave includes a wire retaining arrangement to ensure that the wireline is maintained in contact with the sheave.

25. The apparatus of claim 24, wherein the wire retaining arrangement comprises spring-mounted rollers.

26. The apparatus of claim 1, wherein the frame provides mounting for the sensors.

27. The apparatus of claim 26, wherein the sensor comprises a strain gauge which is mounted on the frame and is configurable to measure wireline tension.

28. The apparatus of claim 27, comprising a load pin, wherein the strain gauge is arranged to measure strain on the load pin, and wherein the load pin is arranged to prevent the first and second frame parts from pivoting relative to one another so that the strain measured by the strain guage on the load pin indicates wireline tension.

29. The apparatus of claim 27, including dual independent strain gauges.

30. The apparatus of claim 26, comprising a hydraulic load cell mounted on the frame.

31. The apparatus of claim 1, including one or more sensors configured to measure one or more of sheave rotation and sheave rotation direction.

32. The apparatus of claim 31, wherein said sensors include at least one of a mechanical counter, encoder and electromagnetic speed sensor.

33. The apparatus of claim 1, including a wireline unit and wherein the wireline unit is configured to process signals received from the sensors to provide depth figures which are accurate for the diameter of wireline being used, without requiring replacement of the sheave wheel.

34. The apparatus of claim 33, wherein a correction is achieved electronically using wireline length information and wireline diameter information.

35. The apparatus of claim 1, comprising an electronics module for processing information from the sensor.

36. The apparatus of claim 35, wherein the module is mounted on a sheave mounting bracket.

37. The apparatus of claim 35, wherein the module houses one or more of sensor amplifiers, power supply, batteries, transmitters and antenna.

38. The apparatus of claim 1, including an independent power source.

39. The apparatus of claim 1, including a power source configured to be recharged through rotation of the sheave.

40. The apparatus of claim 39, wherein the power source comprises a battery arranged to be charged by a generator in an encoder and an energy harvesting module.

41. A wireline work method comprising:
mounting a sheave on a sheave mounting comprising a frame which includes a first frame part and a second frame part, the first and second frame parts being arranged such that tension on the wireless tends to cause the first and second frame parts to pivot relative to one another;
coupling the sheave mounting to a wireline stuffing box;
passing wireline around the sheave;
providing a sensor between the first and second frame parts; and
using the sensor to measure parameters indicative of forces acting on the wireline.

42. The method of claim 41, comprising transmitting the measured information to a wireline control unit.

43. The method of claim 42, comprising transmitting the information wirelessly.

44. The method of claim 43, comprising transmitting the information at radio frequencies.

45. The method of claim 42, comprising communicating with pressure sensors in a lubricator assembly and transmitting information gathered by the pressure sensors with the measured information.

46. The method of claim 45, comprising measuring at least one of well pressure and stuffing box hydraulic pressure.

47. The method of claim 41, comprising using the sheave as a wireline length measuring wheel.

48. The method of claim 41, comprising pressing the wireline against the sheave.

49. The method of claim 41, comprising measuring wireline speed at the sheave.

50. The method of claim 41, comprising measuring forces between stuffing box sheave assembly parts to measure parameters indicative of forces acting on the wireline.

51. The method of claim 41, wherein a sheave contact angle with the wireline is maintained substantially constant to facilitate provision of accurate wireline tension information.

52. The method of claim 41, comprising measuring one or more of sheave rotation and sheave rotation direction.

53. The method of claim 41, comprising displaying and recording wireline depth and tension on an electronic display in an associated wireline unit.

54. The method of claim 41, comprising processing signals received from the sensors to provide depth figures which are compensated for the diameter of wireline being used.

55. The method of claim 41, comprising recharging a power source through rotation of the sheave.

56. The method of claim 41, comprising running wireline between a wireline reel and a lubricator, wherein the wireline experiences less than eleven bending cycles between the wireline reel and the lubricator.

57. A wireline sheave apparatus comprising:
a sheave for accommodating a wireline;
a sheave mounting configured for coupling to a wireline stuffing box, the sheave being mounted on the sheave mounting; and
a sensor for measuring at least one of wireline tension and deployed wireline length at the sheave;
wherein the sheave is frame-mounted on a sheave mounting frame;
wherein the sheave mounting frame provides mounting for the sensor;
wherein the sensor comprises a strain gauge which is mounted on the frame and is configurable to measure wireless tension; and
wherein parts of the frame are arranged to pivot relative to one another and tension on the wireline tends to cause the parts to pivot, such that a strain gauge on a load pin preventing the parts from pivoting indicates wireline tension.

58. A wireline sheave apparatus comprising:
a sheave for accommodating a wireline;
a sheave mounting configured for coupling to a wireline stuffing box, the sheave being mounted on the sheave mounting; and
a sensor for measuring at least one of wireline tension and deployed wireline length at the sheave; and
an electronics module for processing information from the sensor, wherein the module is mounted on a sheave mounting bracket.

59. A wireline sheave apparatus comprising:
a sheave for accommodating a wireline;
a sheave mounting configured for coupling to a wireline stuffing box, the sheave being mounted on a sheave mounting;
a sensor for measuring at least one of wireless tension and deployed wireline length at the sheave; and
a power source configured to be recharged through rotation of the sheave;
wherein the power source comprises a battery arranged to be charged by a generator in an encoder and an energy harvesting module.

* * * * *